April 18, 1961 L. R. PEASLEE 2,980,844
AUTOMATIC CONTROL SYSTEM
Filed Feb. 25, 1959
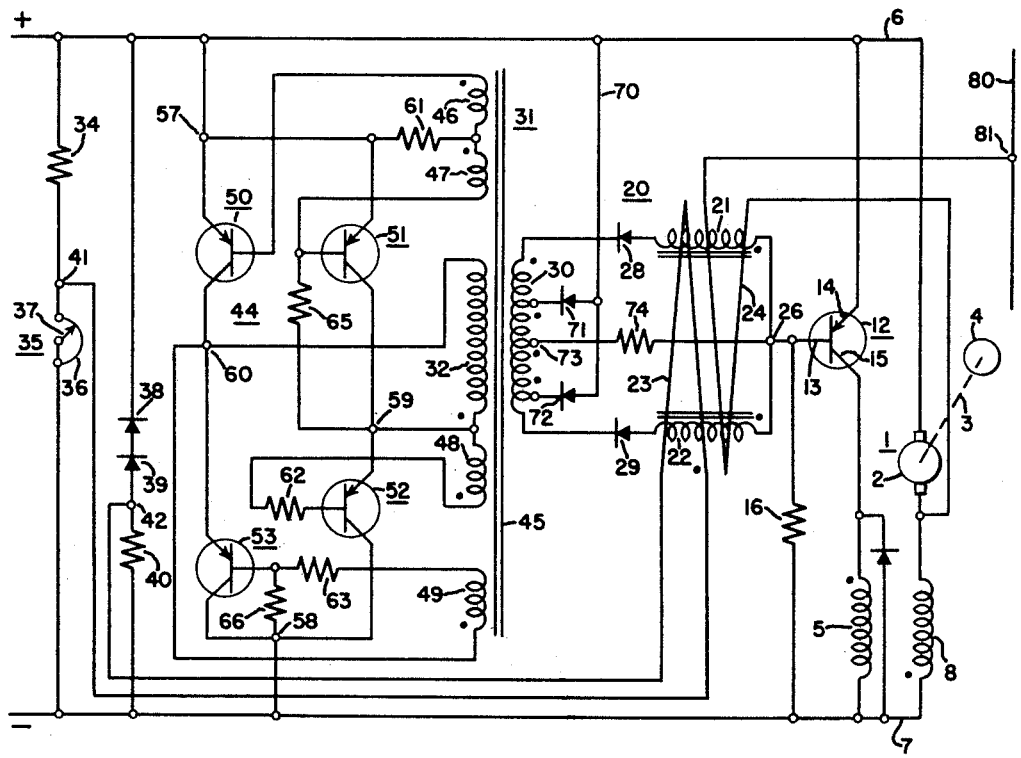
INVENTOR:
LAWRENCE R. PEASLEE,
BY Melvin M. Goldenberg
HIS ATTORNEY.

United States Patent Office 2,980,844
Patented Apr. 18, 1961

2,980,844

AUTOMATIC CONTROL SYSTEM

Lawrence R. Peaslee, Waynesboro, Va., assignor to General Electric Company, a corporation of New York Filed Feb. 25, 1959, Ser. No. 795,405

6 Claims. (Cl. 322—28)

This invention relates to improvements in automatic regulators for dynamoelectric machines. More specifically, it relates to a novel static control system for a direct current dynamoelectric machine.

Control systems or automatic regulators for direct current dynamoelectric machines have heretofore consisted in the main of devices utilizing mechanical elements having movable means. Such devices have taken the form of vibrating fingers or sleds controlling the amount of resistance in series with a dynamoelectric machine control winding in response to an output voltage or other characteristic of the machine. Other types have utilized carbon piles in which the amount of resistance is controlled by the degree of energization of an electromagnetic controlled armature excited from the output terminals of the machine. Such devices, of course, are subject to wear and require periodic readjustment. In addition, they may not exhibit a speed of response and other control characteristics which would be satisfactory in all circumstances. Thus it has been proposed to provide an essentially static automatic regulator for such machines. The devices proposed for this purpose, however, are subject to the objection that they require an external source of energy to initiate their action; that is, to provide an output voltage to the control or excitation winding of the machine in order that the machine if it is, for instance, a direct current generator, can commence supplying an output voltage to the load.

Therefore, it is an object of this invention to provide a novel control system for dynamoelectric machines which utilizes static elements to control the ouptut voltage or other characteristics of the machine and which has no movable parts requiring adjustment and/or replacement.

It is another object of this invention to provide a novel control system for dynamoelectric machines, which system is capable of utilizing the residual voltage of the machine so that upon start-up a battery or other external source is not required for field excitation.

It is another object of this invention to provide a novel control system for direct current dynamoelectric machines which utilizes only the static elements in a circuit which is self-contained to provide for self-excitation of the machine by a circuit which does not depend on any external sources of supply, either direct or alternating current.

Briefly, in one embodiment of the invention I provide a regulator for a direct current generator constituted by a transistor connected in series with a shunt control field of such a generator and initially biased to a conducting state so that upon start-up of the machine, the residual voltage of the generator is available to provide field excitation. As the terminal voltage of the machine increases, a signal proportional thereto is supplied to a circuit comparing it with a reference signal and the difference supplied to the control winding of a magnetic amplifier, the output of which controls the conduction of the transistor during the normal running of the machine. In order to provide an alternating current power supply for the magnetic amplifier, the invention contemplates the provision of a static device utilizing the terminal voltage of the generator as an input. In addition, means are provided to supply a turn-off bias to the transistor in order that its conduction is determined solely by the output of the magnetic amplifier which is controlled by the difference voltage.

The subject matter which I regard as my invention is particularly pointed out and distinctly claimed in the concluding portion of this specification. My invention, however, both as to its organization and method of operation together with further objects and advantages thereof, may best be understood by reference to the following description taken in connection with the accompanying drawing in which:

The sole figure of the drawing is a schematic illustration of one embodiment of the invention.

In the figure of the drawing, the invention is constituted by a dynamoelectric machine illustrated as a direct current generator 1 having an armature 2. The armature 2 is connected mechanically as illustrated by the dotted lines 3 to a suitable driving means or prime mover 4. The principal excitation of the machine is provided by a shunt connected control field winding 5 connected to the buses 6 and 7, which in turn are connected to the terminals of the armature 2. Also connected to one of the terminals of the machine is a series field 8, the function of which will be described in greater detail hereinafter. Connected in series with the shunt field 5 is an amplifying means such as the PNP transistor 12 having a base electrode 13 and emitter electrode 14 and a collector electrode 15. A first biasing circuit for the transistor 12 is provided by a resistor 16 connected between the base 13 and the bus 7. The circuit values of these elements are selected to be so that in the quiescent or initial state, that is, prior to the start-up of the machine 1 when the voltage at the terminals of the armature is zero and upon start-up of the machine, a positive voltage appears on the bus 6 which is supplied to the emitter electrode 14 while a negative voltage appears on the bus 7. Under these circumstances, the base electrode 13 is slightly negative with respect to the emitter electrode 14 due solely to the residual voltage of the machine. Under these circumstances an emitter to-base current exists which is amplified so that a somewhat greater current is supplied via the emitter collector circuit to the field 5. This current through the field 5 causes the armature voltage to increase still further, that is, to the point where the rest of the circuit to be described is effective to take over and control the excitation of the field 5.

In the normal running of the system, control of the transistor 12 is effected by the provision of a magnetic amplifier 20 having a pair of main load or gate windings 21 and 22 and control windings 23 and 24 wound on a suitable saturable magnetic core. The main load windings are connected at one end to a junction 26 connected to the base electrode 13 and at their other end through a pair of unilateral conducting devices 28 and 29 to the opposite ends of a secondary winding 30 of a transformer 31 having a primary winding 32.

Control of the magnetic amplifier is effected by the provision of sensing means constituted by a bridge circuit comprising a resistor 34 and a rheostat 35 having a resistance portion 36 and a slider 37 connected in series across the buses 6 and 7. The other arm of the bridge is constituted by a reference means such as a pair of semi-conducting devices having a critical reverse voltage characteristic such as the so-called Zener diodes 38 and 39 connected in series with a resistance 40 across the buses 6 and 7. The opposite ends of the control winding 22 are connected across the output terminals of the bridge at junctions 41 and 42. The arrangement is such a predetermined ratio of voltages is obtained between the junction 42 and bus 6 and between this junction 42 and the bus 7. Similarly a ratio of voltages is obtained between the junction 41 and bus 6 and between this junction 41 and bus 7. The desired generator terminal voltage is obtained by adjusting the rheostat 35 so that for any given terminal voltage unless these ratios are equal current will flow in the winding 23 in such a direction as to increase or decrease the saturation of the magnetic amplifier core and consequently the machine output.

As stated above, the transformer 31 constitutes a means for providing an alternating current supply for the magnetic amplifier 20. More specifically, the means whereby an alternating current may be supplied to the transformer 31 is constituted by a static inverter designated generally by reference numeral 44. This embodiment of the invention illustrates, by way of example only, a typical inverter suitable for use in this combination. Thus the inverter comprises the transformer 31 having a saturable core illustrated schematically by reference numeral 45. In addition to the primary winding 32, also provided are four feedback windings 46, 47, 48, and 49. A bridge circuit is constituted by four transistors 50, 51, 52 and 53. A pair of input terminals 57 and 58 are connected to the buses 6 and 7 respectively while a pair of output terminals 59 and 60 are connected to the opposite ends of the primary winding 32. The base electrodes of the transistors 50 and 51 are connected through their respective feedback windings 46 and 47 through a resistor 61 to the input terminal 57. The transistors 52 and 53 have their base electrodes connected through resistors 62 and 63 respectively to their respective feedback windings 48 and 49 to the terminals 59 and 60 respectively. A bias resistor 65 is connected between the base electrode of the transistor 51 and the terminal 59 while a bias resistor 66 is connected between the base electrode of the transistor 53 and the terminal 58.

In the operation of this portion of the system, it may be seen that inasmuch as the transistors 50 to 53 are of the PNP variety if an initial condition of unbalance is achieved, then the windings 32 and 46 to 49 have the relative polarities indicated by the polarity dots illustrated in association with each of these windings. The base electrode of the transistor 51 will be negative with respect to its emitter electrode and emitter-to-collector current will flow in this transistor. On the other hand, the base electrode of the transistor 50 will be positive with respect to its emitter electrode and this transistor will be maintained in a non-conducting condition. Similarly, the base electrode of the transistor 53 is negative with respect to its emitter electrode and this transistor will be in a condition to conduct. The base electrode of the transistor 52 will be positive with respect to its emitter and this transistor will be maintained in a non-conducting condition. Current will therefore flow from the input terminal 57 in the emitter-to-collector circuit of the transistor 51, terminal 59 through the winding 32 to the terminal 60, and emitter-to-collector circuit of transistor 53 to the terminal 58 and bus 7. Under these conditions, current will be induced in the feedback windings 46 to 49 and in the secondary winding 30. This condition will be maintained until the core 45 is saturated whereupon voltages will no longer be induced in the windings 46 to 49 and the secondary winding 30. When this situation exists, the base excitation currents for the transistors 51 and 53 are removed and these transistors become non-conducting thereby stopping the flow of primary current in the winding 32 and reversing the rate of change of core flux. The voltages induced in the feedback windings 46 to 49 are thereupon reversed and the transistors 50 and 52 will conduct while the transistors 51 and 53 become non-conducting. While the transistors 50 and 52 conduct, current will flow from the bus 7, terminal 57, emitter-to-collector of transistor 50, terminal 60 downwardly (as shown in the drawing) through the winding 32, terminal 59, emitter-to-collector of transistor 52, and terminal 58 to the bus 7. In this manner, a square wave is produced in the primary winding 32 and inductively reproduced in the secondary or magnetic amplifier supply winding 30.

As discussed above, the bias on the transistor 12 in the quiescent or initial state is such that this transistor is able to conduct in order to provide for initial excitation of the field winding 5. In order that the transistor 12 may be controlled by magnetic amplifier 20, a turn-off bias is provided to be effective upon the presence of a suitable voltage at the generator terminals. The means for providing this bias is constituted by a connection 70 to the bus 6 at one end and at its other end to a pair of diodes 71 and 72 having their cathodes connected to taps on the secondary winding 30. A center tap 73 of the secondary winding 30 is connected through a resistor 74 to the junction 26 and thence to the base electrode 13 of the transistor 12. The operation of this portion of the system is as follows. When the upper half of the secondary winding 30 is negative with respect to the center tap 73, current will flow through the resistor 70, diode 71 and resistor 74 to the junction 26 to the base 13 and resistor 16 to bus 7. Thus the base 13 is positive with respect to the bus 6 to maintain the transistor in an off condition. On the next half cycle, when the lower half of the secondary winding 30 is negative with respect to the center tap 73, current will flow through the connection 70, rectifier 72, center tap 73, resistor 74 and junction 26 to the base electrode 13 to provide a holdoff bias on this half cycle.

The invention also contemplates means for controlling the generator when it is paralleled in a system with other generators. Under such circumstances, a so-called equalizing bus 80 is ordinarily provided. Connected at one end to this equalizing bus 80 at a junction 81 and at its other end to the junction of a suitable impedance such as the series field 8 and armature 2 is the control winding 24 which has the function of comparing the current produced by the generator 1 with the currents of the other generators in the system as developed in the equalizing bus 80 to provide a control signal to change the conduction point or firing angle of the magnetic amplifier in such a direction to increase or decrease the generator voltage and current in response to the system requirements in order that all the generators in the system may share the load equally.

The over-all operation of the system is as follows. If it is assumed that the system is in a quiescent or initial state, that is, the generator 1 is not running, then upon rotation of the generator the residual magnetism in the magnetic structure thereof is effective to produce a slight voltage at the terminals of the armature 2. The transitor 12, by virtue of the bias provided by the resistor 16, is able to conduct an emitter-to-base current which is amplified and the consequent emitter-to-collector current is supplied to the field 5 causing the generator voltage to increase. This further increases the current through the emitter junction of the transistor 12 causing the field current and armature voltage to increase still further. At a relatively low voltage, the inverter or square wave generator 44 starts to oscillate or provide its square wave alternating output as described above. At the same time, generator voltage is reaching a value effective to supply a turn-off bias through the connection 70 and diodes 71 and 72 as described above. Concurrently the voltage on the secondary winding 30 is high enough to overcome the forward drop of the diodes 28 and 29, and the magnetic amplifier begins operation in the fully on state; that is to say, there is zero control current from the sensing circuit. The voltage supplied by the magnetic amplifier is sufficiently high to overcome the turn-off bias voltage so that the transistor 12 is intermittently biased to a fully conducting state wherein the ratio of full conducting intervals to non-conducting intervals is high thus permitting the rise in generator voltage to continue. The increase of generator voltage continues until the system regulating voltage is approached. At this point, the output voltage of the sensing circuit from junction 41 to 42 reverses and a bias or control current is supplied through the control winding 22 to the magnetic amplifier 20 in such a direction as to reduce the conducting angle of the magnetic amplifier or retard the point at which it conducts load current. This tends to intermittently reduce the turn on bias voltage on the base electrode 13 of the transistor 12 thus causing it to be non-conducting for a greater portion of the time. Under these circumstances the ratio of full conducting intervals to non-conducting intervals is such that the average emitter-to-collector current will be the proper amount to maintain the generator voltage at the amount set by the rheostat 35.

In the operation of this system in a parallel system, if the generator is producing a current equal to the average of the currents of the other generators, the voltage from the junction of the field 8 with the terminal of the generator to the junction 81 is zero and no change in the excitation results as a consequence of the effect of the control field 24. If the generator current is high, the junction of the field 8 and generator terminal will be more negative than the junction 81 and a resultant current will appear in the control winding in such a direction as to reduce the generator voltage and current. Correspondingly, if the generator current is low, the current in the control winding 24 will be in the reverse direction and will be effective to cause the generator current and voltage to be increased.

It should be pointed out that the use of a magnetic amplifier having two isolated inputs, that is, the voltage control winding 22 and the current control winding 24, provides a magnetic addition of these two inputs in a manner similar to that provided by isolated potential and current windings in the well-known carbon pile regulator. This arrangement makes possible the direct interchangeability of this system with such a carbon pile regulator in a simple straightforward manner. Further, it permits generators regulated in accordance with the invention to be paralleled with generators regulated by such carbon pile regulators.

Although in accordance with the provisions of the Patent Statutes this invention is described as embodied in a concrete form and a specific mode of operation and the principles thereof have been explained together with the best manner in which it is now contemplated applying those principles, it will be understood that the apparatus shown and described is merely illustrative and that the invention is not limited thereto since alterations and modifications will readily suggest themselves to persons skilled in the art without departing from the true spirit and scope of the invention.

What I claim as new and desire to secure by Letters Patent of the United States is:

1. A regulator for a direct current generator having an armature and a shunt control field winding comprising a PNP transistor having base, emitter and collector electrodes, said collector and emitter electrodes being connected in series with said control field winding, a magnetic amplifier comprising a pair of main load windings wound on a saturable core, means connecting said main load windings to said base electrode, a transformer having a primary winding and a secondary winding, said secondary winding constituting alternating current supply means for said magnetic amplifier, a rectifying device connected in series with each end of said secondary winding and each of said main load windings and poled to conduct when its respective transformer end is negative, means for providing a bias to maintain said transistor in an off condition comprising a connection to one terminal of said generator armature, a rectifier, a portion of said secondary winding connected in series with said base electrode and a resistor connected between said base electrode and the other terminal of said generator winding, a unilateral semi-conductor device having a critical reverse voltage characteristic connected to said armature, a generator voltage adjusting rheostat connected to said generator armature, a control winding for said magnetic amplifier connected to said semi-conductor device and said rheostat, means for supplying an alternating current to said primary winding from said armature terminals constituted by a static inverter means having input terminals and output terminals and means connecting said input terminals to said generator armature and said output terminals to said primary winding.

2. A regulator for a direct current generator having an armature and shunt field winding comprising a transistor amplifier having base, collector and emitter electrodes, said emitter and collector electrodes connected in series with said control field winding, a magnetic amplifier comprising main load windings wound on a saturable core, means connecting said main load windings to said base electrode, a transformer having a primary winding and a secondary winding, means connecting said secondary winding to said main load windings whereby said transformer constitutes an alternating current supply for said magnetic amplifier, a unilateral conducting device connected in series with said secondary winding and each of said main load windings whereby a unidirectional current of a polarity to cause said transistor to conduct is supplied to said base electrode, means connected between said base electrode and a first terminal of said armature to provide a current path for conduction of said transistor upon start-up of said generator, means connected in series with a second terminal of said generator, said secondary winding, said base electrode and said current path, means to provide a bias voltage tending to maintain said transistor off during normal running of the generator, unilateral conducting means having a critical reverse voltage characteristic connected to said generator terminals, an adjustable voltage divider connected across generator terminals, a control winding for said magnetic amplifier connected to said voltage divider and to said last-mentioned unilateral conducting means, means for supplying an alternating current to said primary winding comprising a static inverter having input terminals and output terminals, said input terminals being connected to said armature terminals and said output terminals being connected to said primary winding.

3. A regulator for a direct current generator having an armature and a shunt control field winding comprising a transistor amplifier having input and output electrodes, said output electrodes connected in series with said control field winding, a magnetic amplifier having main load windings, means connecting said main load windings to said input electrodes, means for supplying an alternating current to said magnetic amplifier, unilateral conducting means connected in series with said main load windings and said input electrodes to control the conduction of said transistor, means connected between said input electrodes and a first terminal of said armature to provide a bias current path for conduction of said transistor upon start-up of the generator, means connected between a second terminal of said armature and said input electrodes to provide a bias current path tending to maintain said transistor off during normal running of the generator, means for deriving a reference voltage, means for deriving a signal voltage proportional to the generator terminal voltage, and a control winding for said magnetic amplifier connected between said last two mentioned means.

4. A regulator as set out in claim 3 including a second control winding on said magnetic amplifier connected to a terminal of the armature and a source of current reference signal.

5. A regulator for a generator forming a part of a system of such generators having an equalizing bus, each generator having an armature and a control field winding in shunt therewith and impedance means connected in series therewith, comprising a transistor having input and output electrodes, said output electrodes being connected in series with said field, means connecting said input electrodes to the terminals of the armature to provide current path effective to bias said transistor to a conducting state upon start-up of the generator, a signal translating stage for controlling the conduction of said transistor, means for supplying a reference voltage, means for developing a feedback voltage proportional to the terminal voltage of the generator, means responsive to the difference of said reference voltage and said feedback voltage to control said signal translating stage to cause said transistor to supply more current to the control field winding when said feedback voltage is less than said reference voltage, further means for controlling said signal translating stage and consequently the conduction of said transistor in response to the difference between the current in said impedance means and the current in the equalizing bus, and means providing a current path to the input electrodes of said transistor tending to maintain said transistor in a non-conducting state during the normal running of the generator.

6. A regulator for a generator having an armature and a control field winding in shunt therewith, comprising a transistor having input and output electrodes, said output electrodes being connected in series with said field, means connecting said input electrodes to the terminals of the armature to provide current path effective to bias said transistor to a conducting state upon start-up of the generator, a signal translating stage for controlling the conduction of said transistor, means for supplying a reference voltage, means for developing a feedback voltage proportional to the terminal voltage of the generator, means responsive to the difference of said reference voltage and said feedback voltage to control said signal translating stage to cause said transistor to supply more current to the control field winding when said feedback voltage is less than said reference voltage, and means providing a current path to the input electrodes of said transistor tending to maintain said transistor in a non-conducting state during the normal running of the generator.

References Cited in the file of this patent

UNITED STATES PATENTS

| | | |
|---|---|---|
| 2,809,301 | Short | Oct. 8, 1957 |
| 2,886,763 | Zelina | May 12, 1959 |

FOREIGN PATENTS

| | | |
|---|---|---|
| 787,610 | Great Britain | Dec. 11, 1957 |